(No Model.)

C. B. CARTER.
LEMON JUICE EXTRACTOR.

No. 577,976.                     Patented Mar. 2, 1897.

WITNESSES
John Buckley
C. Gerst

INVENTOR
Charles B. Carter
BY
Edgar Tate &c.
ATTORNEYS

THE NORRIS PETERS CO., PHOTO-LITHO., WASHINGTON, D. C.

UNITED STATES PATENT OFFICE.

CHARLES B. CARTER, OF BORDENTOWN, NEW JERSEY.

LEMON-JUICE EXTRACTOR.

SPECIFICATION forming part of Letters Patent No. 577,976, dated March 2, 1897.

Application filed July 1, 1896. Serial No. 597,687. (No model.)

*To all whom it may concern:*

Be it known that I, CHARLES B. CARTER, a citizen of the United States, and a resident of Bordentown, in the county of Burlington and State of New Jersey, have invented certain new and useful Improvements in Lemon-Juice Extractors, of which the following is a specification, reference being had to the accompanying drawings, forming a part thereof, in which similar numerals of reference indicate corresponding parts wherever found throughout the several views.

This invention relates to devices for extracting the juice of lemons, and the object thereof is to provide an effective device of this class which is simple in construction and operation and which is adapted to be used in connection with a cup, goblet, or similar vessel which is designed to receive the extracted juice.

The invention consists of two separate parts, one of which comprises a cylindrical cup-shaped receptacle having a perforated bottom and a handle connected therewith, and the other consists of a circular disk or head provided with an angular handle, said parts being constructed as hereinafter described.

The invention is fully disclosed in the following specification, of which the accompanying drawings form a part, in which—

Figure 1:
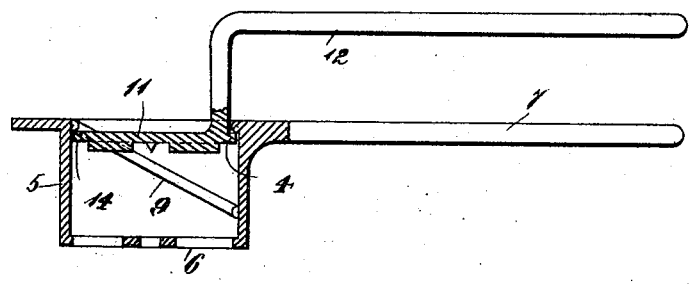
Figure 2:
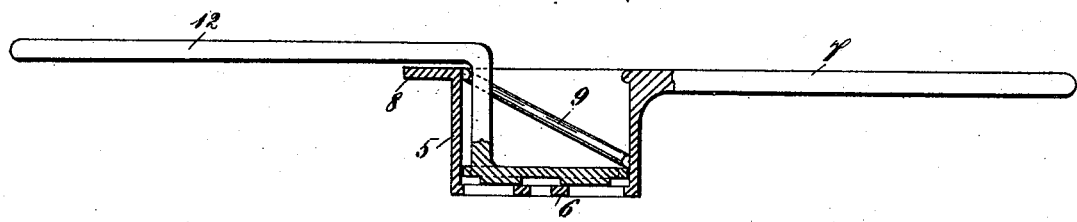
Figure 3:
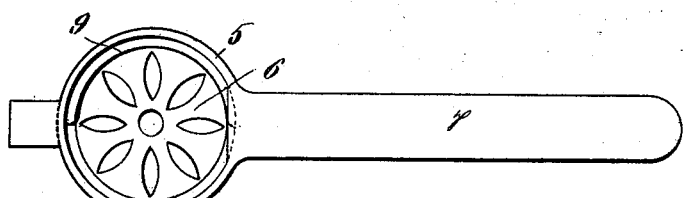
Figure 4:
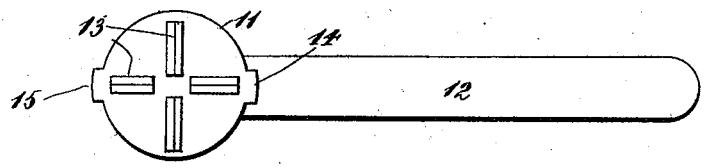

Figure 1 is a sectional side view of the separate parts of my improved lemon-juice extractor; Fig. 2, a similar view showing the parts in a different position; Fig. 3, a plan view of one of the parts thereof, and Fig. 4 a bottom plan view of the other part.

In the practice of my invention I provide a lemon-juice extractor comprising two parts, one of which consists of a cylindrical cup-shaped receptacle 5, having a perforated bottom 6, and provided at one side with a handle 7, and preferably provided at the opposite side with a shoulder or projection 8, which extends in line with said handle, and the handle 7 and the shoulder or projection 8 are preferably formed on or secured to the upper side of the receptacle 5, and said receptacle is provided on the inner side thereof with two spiral ribs 9 and 10, the first of which begins near the top adjacent to the shoulder or projection 8 and extends downwardly to the bottom of the receptacle on the opposite side, and the other begins near the top adjacent to the end of the handle 7 and extends downwardly and around the side of the receptacle opposite that on which the spiral rib 9 is formed and which terminates near the bottom of said receptacle beneath the shoulder or projection 8. The other part of the extractor consists of a circular head or disk 11, which is provided with an upwardly and outwardly directed handle 12, and which is also preferably provided on its under surface with radial ribs or projections 13, and the disk or head 11 is also provided on the side adjacent to the handle with an outwardly-directed lug or projection 14, and the opposite side with a similar lug or projection 15.

In operation the lemon, or the half thereof, is placed in the receptacle 5 and one part of the extractor is held in one hand and the other part in the other hand with the handles 7 and 12 parallel, the handle 12 being over the handle 7, and said disk or head is inserted into the receptacle 5 in such manner that the lug or projection 15 passes beneath the upper end of the spiral rib 9 and the lug or projection 14 beneath the upper end of the spiral rib 10, and the handle 12 is then turned to the left, in which operation the head or disk 11 is forced downwardly into the position shown in Fig. 2, which position it reaches when the handle 12 projects in line with the handle 7 or in the opposite direction. In this operation the lemon is firmly compressed between the bottom 6 of the receptacle and the disk or head 11, and the juice is compressed or forced therefrom and passes through the perforated bottom 6 into a suitable cup, goblet, or other vessel prepared therefor.

This device is simple in construction and operation and perfectly adapted to accomplish the result for which it is intended, while being also strong and durable, and in practice I prefer to construct the same of metal or from a combination of metals which will not corrode or be injuriously affected by fluids or acids, and it will thus be seen that I provide an effective device for extracting the juice from lemons without extracting the oil from the rind, and it is evident that changes in the form of the various parts thereof may be made without departing from the spirit of my invention or sacrificing its advantages.

Having fully described my invention, I claim as new and desire to secure by Letters Patent—

1. The herein-described lemon-juice extractor, which comprises two parts, one of which consists of a cylindrical cup-shaped receptacle, having a perforated bottom, and a handle connected with one side thereof, said receptacle being provided in its opposite sides with spiral ribs as described, and the other part consisting of a circular disk or head, having an angular handle connected therewith, and being provided on its opposite sides with lugs or projections, which are adapted to operate in connection with said ribs, substantially as shown and described.

2. The herein-described lemon-juice extractor, which comprises two parts, one of which consists of a cylindrical cup-shaped receptacle, having a perforated bottom, and a handle connected with one side thereof, said receptacle being provided in its inner side walls, with two spiral ribs, one of which begins opposite the handle, and extends downwardly, and around one side of the receptacle, and terminates below the handle, and the other of which begins adjacent to the handle, and extends downwardly and around the opposite side, and terminates opposite the handle, and the other part consisting of a circular disk or head provided with an angular handle, and with lugs or projections on the opposite sides thereof, which are adapted to operate in connection with said ribs, substantially as shown and described.

3. The herein-described lemon-juice extractor, which comprises two parts, one of which consists of a cylindrical cup-shaped receptacle, having a perforated bottom, and a handle connected with one side thereof, said receptacle being provided in its inner side walls with two spiral ribs, one of which begins opposite the handle, and extends downwardly, and around one side of the receptacle, and terminates below the handle, and the other of which begins adjacent to the handle, and extends downwardly and around the opposite side, and terminates opposite the handle, and the other part consisting of a circular disk or head provided with an angular handle, and with lugs or projections on the opposite sides thereof, which are adapted to operate in connection with said ribs, said disk or head being also provided on its under side with radial ribs or projections, substantially as shown and described.

In testimony that I claim the foregoing as my invention I have signed my name, in presence of the subscribing witnesses, this 26th day of June, 1896.

CHARLES B. CARTER.

Witnesses:
W. W. HILL,
CHARLES S. ROGERS.